United States Patent [19]

Behrens et al.

[11] Patent Number: 5,258,604
[45] Date of Patent: Nov. 2, 1993

[54] BAR CODE SCANNER

[75] Inventors: James Behrens, Macedon; Vincent Lamanna, Webster, both of N.Y.

[73] Assignee: PSC, Inc., Webster, N.Y.

[21] Appl. No.: 826,742

[22] Filed: Jan. 28, 1992

[51] Int. Cl.⁵ .................................. G06K 7/10
[52] U.S. Cl. ........................ 235/462; 235/463
[58] Field of Search ............... 235/462, 463, 472

[56] References Cited

U.S. PATENT DOCUMENTS

| | | | |
|---|---|---|---|
| 4,894,522 | 1/1990 | Elliot | 235/462 |
| 4,930,848 | 6/1990 | Knowles | 235/472 |
| 5,081,342 | 1/1992 | Knowles et al. | 235/462 |
| 5,179,270 | 1/1993 | Taussig et al. | 235/462 |

Primary Examiner—John Shepperd
Attorney, Agent, or Firm—M. LuKacher; J. Murphy

[57] ABSTRACT

A portable bar code scanner system uses various interchangeable interface boards which allow the scanner system to be used with a plurality of different input/output devices (transaction terminals, computers, cash registers) having different operating characteristics. One of these boards is capable of accepting and transmitting digital character strings of various bit lengths to accommodate the operating characteristics of input/output devices using data in a string of predetermined bit length.

17 Claims, 7 Drawing Sheets

BAR CODE SCANNER

The present invention relates to bar code scanner systems and particularly to portable bar code scanners which are readily made compatible with several different transaction terminals or other input/output devices which operate with data in different formats.

Portable bar code scanners optically scan printed bar codes and translate them into digital electrical signals capable of being processed by an associated transaction terminal which may be all or part of a host computer, cash register or other input/output device (referred to generally as "I/O" Devices). These portable scanners typically are hand-held during operation, and the circuitry within the scanner is designed to operate with only one type of terminal. The scanners may contain circuitry which delivers a digitized bar code signal (pulses of duration corresponding to the width of the bars of the code and separated by intervals corresponding to the width of the spaces of the code) to the I/O Device without decoding, leaving decoding steps to the I/O Device. Because they usually are designed for use with a particular I/O Device, many scanners in current use are not adaptable for use with I/O Devices having different operating characteristics.

It is the principal object of this invention to provide an improved bar code scanner system, and particularly a system which may be implemented as a unitary, portable hand held bar code scanner which has intelligent circuitry which enables it to be compatible with I/O Devices operative to handle data in different formats or protocols, such as RS-232, OCIA, Wedge and RS-485.

Briefly described, a bar code scanner system embodying the present invention makes use of signal processor and interface apparatus for handling bar code and control signals in which digitized bar code signals are encoded and selectively translated into configurations (formats or protocols) recognizable by any of a plurality of different I/O Devices which are selected for use with the scanner. A selected one of a plurality of different interfaces determines which I/O Device will be compatible with the scanner. The interface has means for storing and applying an identification code representing the identity of a selected one of the I/O Devices to the decoding means of the scanner for operating the decoding means and for transferring the decoded signals and the command signals between the selected one of the I/O Device and the decoding means.

The foregoing and other objects, features and advantages of the invention, as well as a presently preferred embodiment thereof will become more apparent from a reading of the following description in connection with the accompanying drawings in which.

Figure 1:
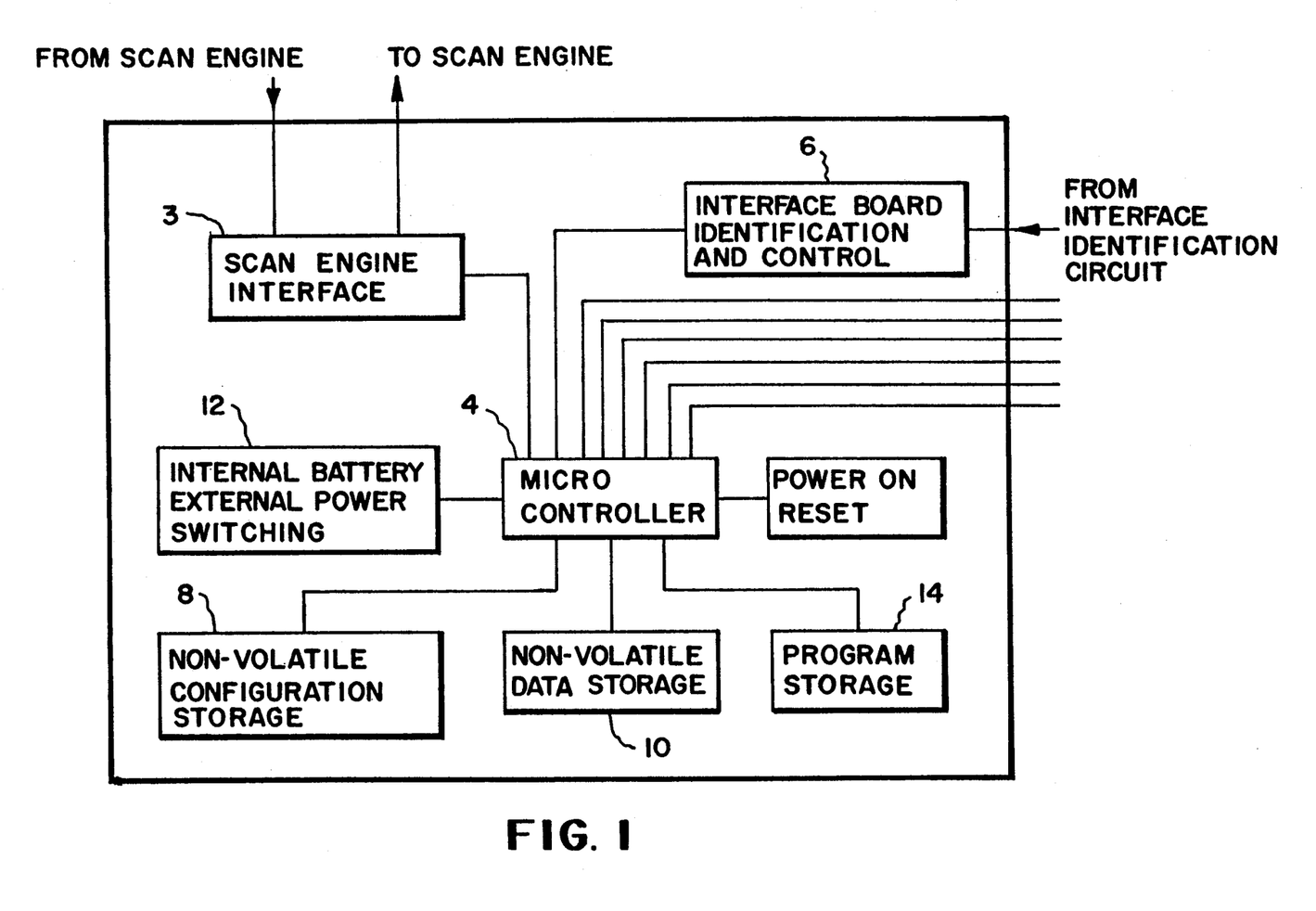
FIG. 1 is a block diagram of circuitry, including a decoder, which is arranged on one circuit board or card (which terms are used synonymously herein), and which is contained in a bar code scanner system embodying the invention, and particularly on one of the cards in the handle of a hand held scanner shown in FIGS. 6-8.
Figure 6:
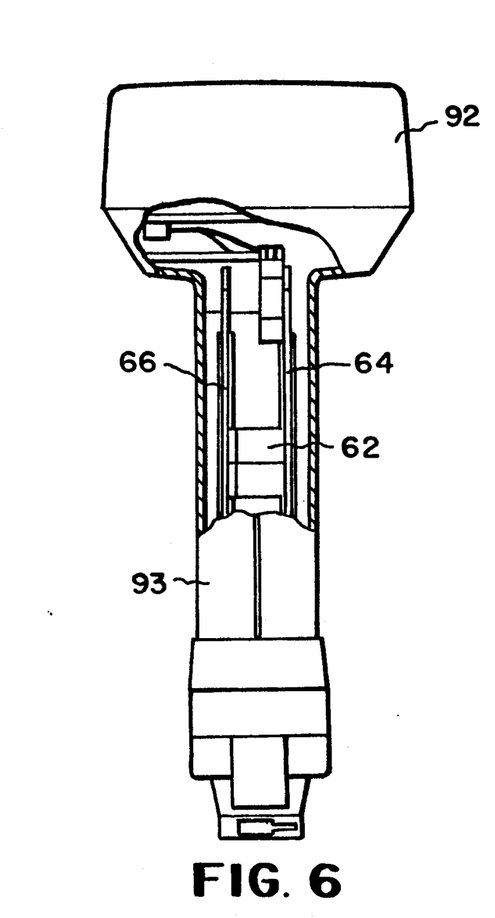
FIG. 6 is a rear view of a hand held portable bar code scanner system, partially in section, and showing the circuit cards or boards within the scanner.
Figures 7, 8:
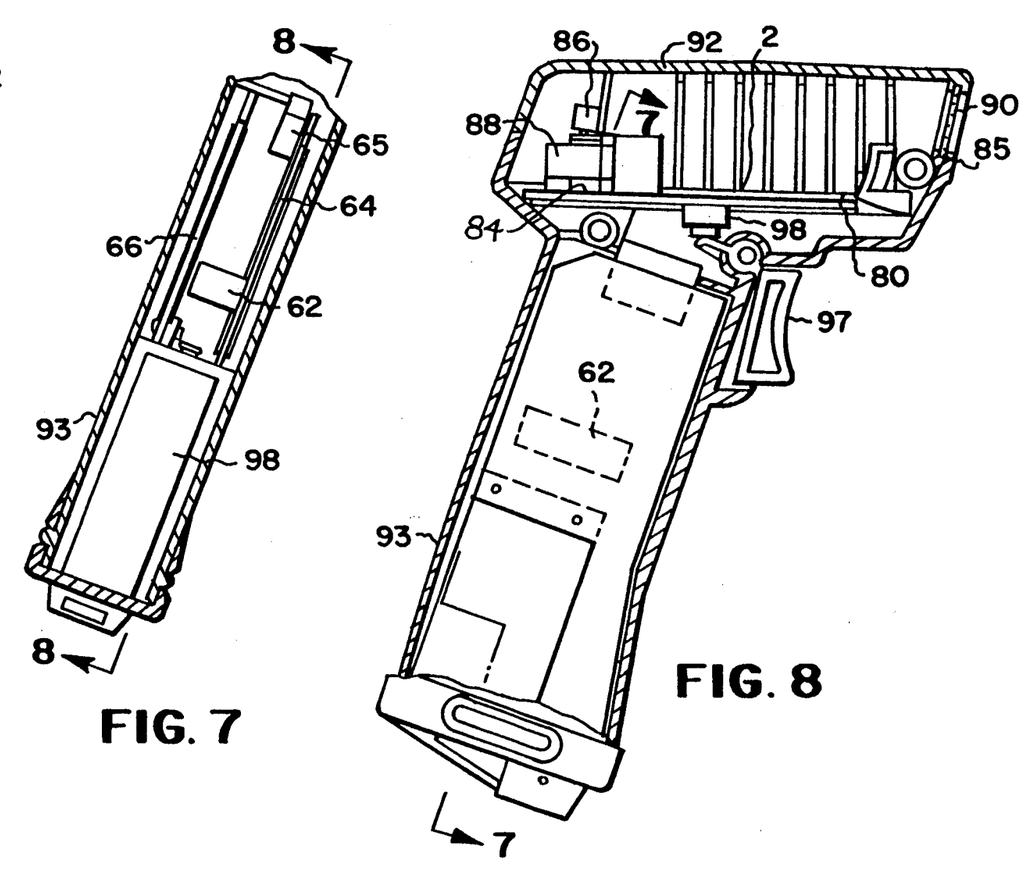
FIG. 7 is a fragmentary cross-sectional view of the scanner of FIG. 6 taken along line 7—7 in FIG. 8 showing the handle of the scanner.
FIG. 8 is a cross-sectional side view of the scanner taken along the line 8—8 in FIG. 7.

Referring more particularly to FIGS. 6—8 there is shown a scanner similar physically to known and available scanners. It has a scan engine 2 on a plate 80 which also supports circuits for supplying current to a laser diode and processing and digitizing the bar code signal obtained from a photodetector, both the photodetector and the laser diode being located in the area of a mount 84 on the plate 80. The beam from the laser diode is incident on a mirror 85 and is reflected to a mirror 86 reciprocated by a motor 88. The beam exits through a window 90 in an upper housing 92 and is retroreflected from the code via mirrors 86 and 85 to the photodetector. See FIG. 8. The lower part 93 of the housing provides a handle. An operator initiates scanning by pulling a trigger 97 which operates a switch 98. The scan engine 2 then sends an initiation signal through scan engine connector 65 to the scan engine interface 3 (FIG. 1) of the decoder board 66 (FIGS. 6 and 7) indicating that an operator has actuated the bar code scanning function. The scan engine interface 3 directs this signal to the microcontroller 4 of the decoder board. The presently preferred microcontroller is the Motorola 6303-B chip. The microcontroller 4 responds to the initiation signal with a return signal indicating that the microcontroller is prepared for the scan engine to scan. When the scan engine optically scans the bar code, the returned light is converted by the scan engine to the digitized electrical signal representing the bar code. This electrical signal is sent to the scan engine interface 3, which in turn applies it to the microcontroller 4 for decoding into ASCII character strings formatted to be recognizable by attached I/O Devices. The signals can be decoded and formatted for use with I/O Devices recognizing RS-232, Optically Coupled Interface Adapter ("OCIA"), or various IBM compatible signals (for the 4683 I/O Device (cash register/transaction terminal) or the wedge compatible format or protocol.

Figure 9:
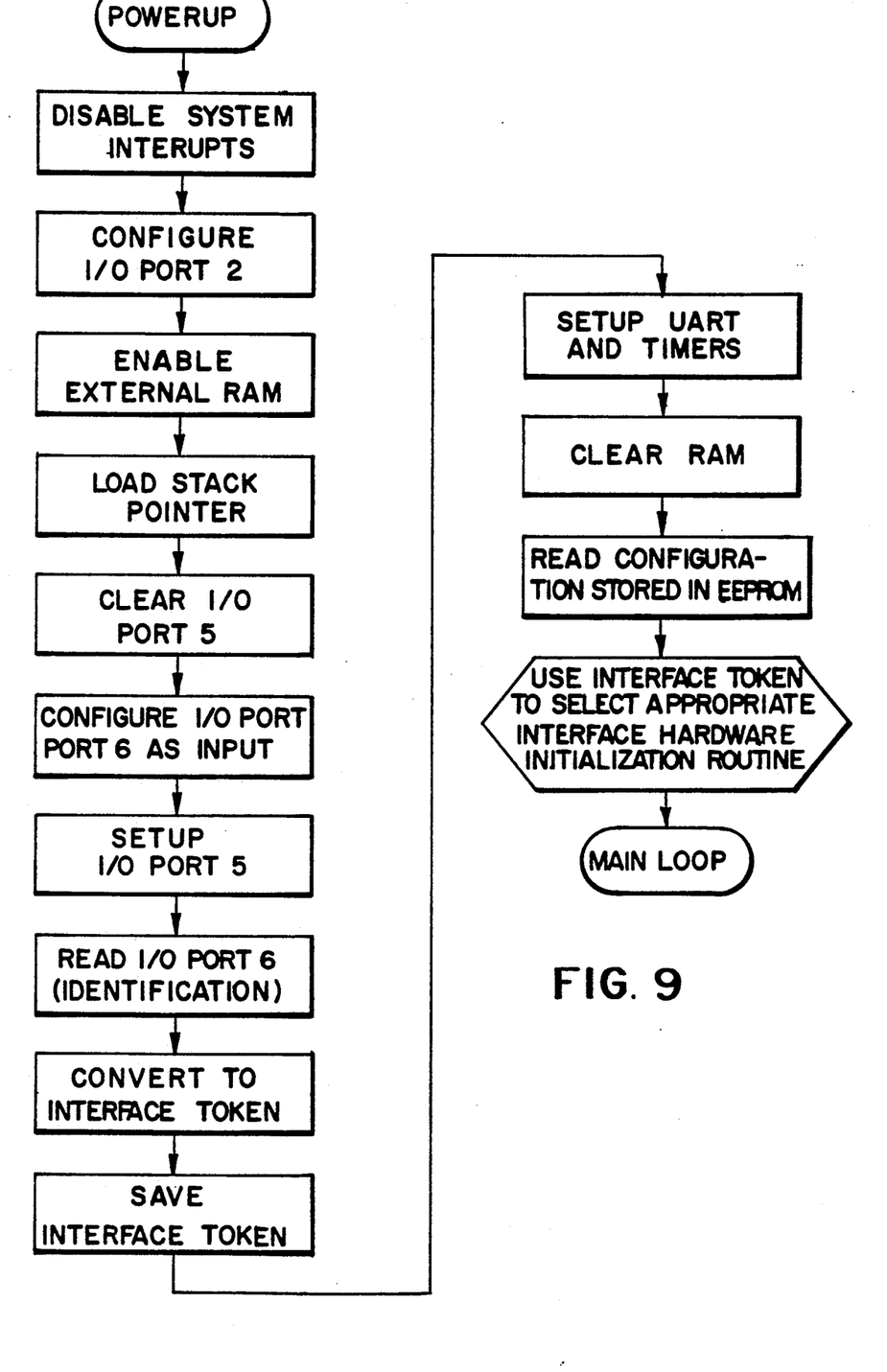
FIG. 9 is a flow chart showing the scanner's operational sequence for configuring the system for operation with a particular I/O Device.

The format to which the electrical bar code signal is translated is determined by the format required by the associated I/O Device. Each of the different desired formats is identified by an identification code stored on the particular interface board which is used. The interface board identification and control circuit 6 (FIG. 1) of the decoder board 66 polls the interface board at power-up for the identification code associated with the attached I/O Device. The identification code is transferred from the interface identification circuit on the interface board to the identification and control circuit 6 of the decoder board. The interface board identification and control circuit 6 applies this code as a token, to the microcontroller 4, which in turn stores it in memory located in the microcontroller 4 (the memory may be located separately from the microcontroller, however). The token is used to retrieve from program storage 14, which is located on the decoder board, the address of a routine that is specific to the I/O board functions. The routine is stored in program storage 14. The configuration storage 8 contains such information as the required baud rate for serial transfer of information to the I/O Device, parity bit information and data format requirements. A non-volatile data storage circuit 10 contains additional codes required by the I/O Device for processing bar code data. These additional codes may be added to bar code information during formatting. The non-volatile data storage 10 is a battery-backed-up RAM. The programming of the microcontroller 4 in setting up the desired format is shown in FIG. 9.

The decoder board may also contain an internal battery/external power switching circuit 12. This circuit automatically switches the scanner's power supply to an internal battery (98, FIG. 7) when external power is removed. This feature is useful, for instance, if the user desires to use the scanner portably without an umbilical connection to the I/O Device.

The decoder board 66 may also include a magnetic card reader input or wand emulation output as described below.

Figure 2:
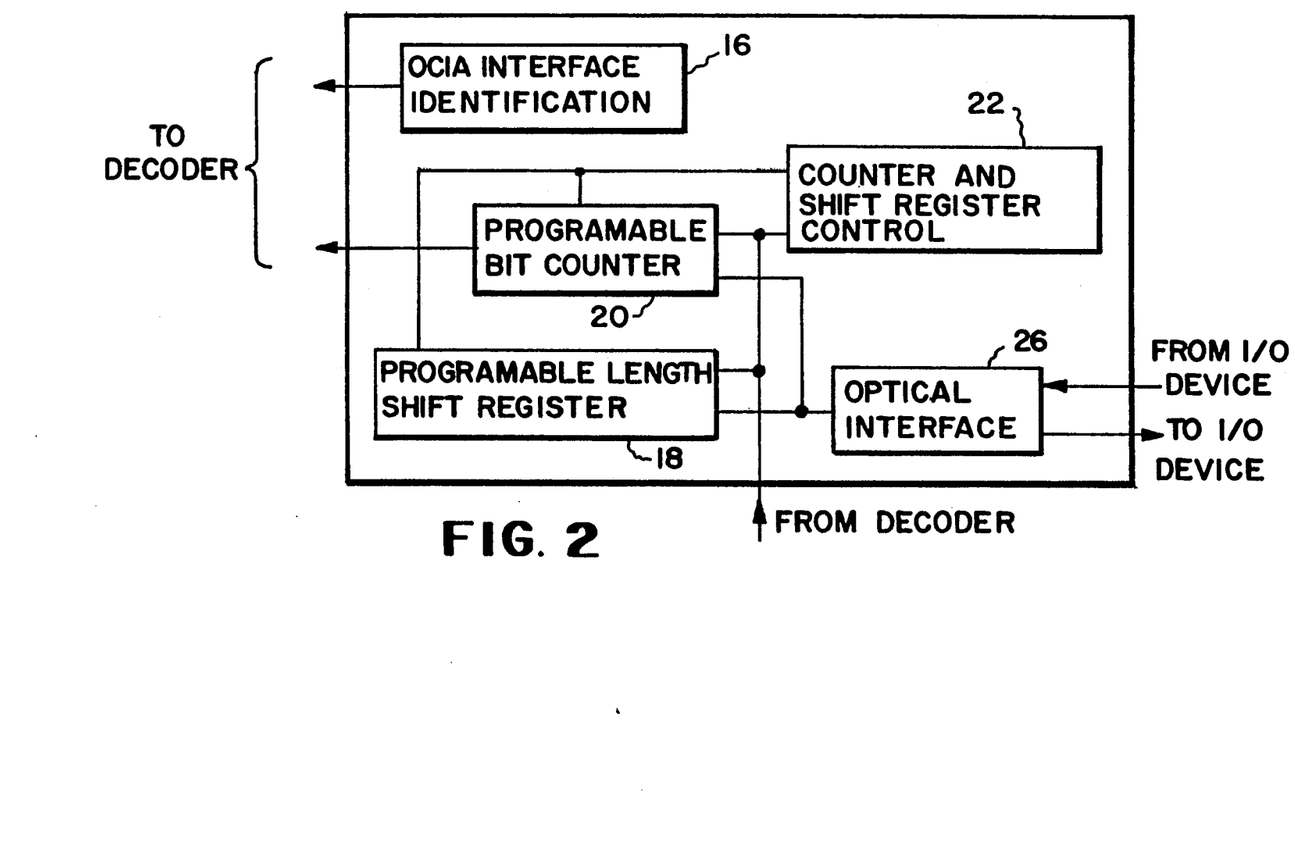
FIG. 2 is a block diagram of the circuitry of a scanner system embodying the invention which provides an interface between the circuitry shown in FIG. 1 and an I/O Device, specifically an I/O Device which operates in accordance with the OCIA format or protocol.

The first type of I/O Device compatible with the scanner is the National Cash Register ("NCR") cash register and related devices. The OCIA interface board, as depicted in FIG. 2, includes an interface identification circuit 16. This circuit stores a four bit identification code representing the attached I/O Device. The interface board identification and control circuit 6 can read the code and create a token representing the identification code. The token is received by the microcontroller 4 (FIG. 1) and applied to the configuration storage circuit 8, initiating the configuration of the scanner for use in the OCIA mode.

The OCIA interface is capable of processing data words having various lengths. To accomplish this, the OCIA interface board includes a programmable length shift register 18 which can be programmed to transmit data signals containing eight or nine bits per data word plus a start bit which signals the I/O Device that a data word is about to be sent. The operator chooses the desired word length by scanning a system programming label prior to initial use. The broadside load of data to the shift register and the programming of the shift register to receive an eight or a nine bit word is accomplished in two successive steps triggered by clock pulses from the microcontroller 4. The programmable length shift register 18 operates in conjunction with a programmable bit counter 20 to process the variable length data words. On the first clock pulse, eight bits of data are loaded from the microcontroller 4 by parallel transfer to the shift register 18. On the second clock pulse, a four bit, word length identification code is sent by parallel transfer from the microcontroller 4 to the bit counter 20. The four data lines delivering this code are shared with the shift register. That is, four of the eight data lines connecting the microcontroller 4 and the shift register 18 also deliver data to the bit counter 20. A fifth one of the eight data lines is also connected to the serial-in connection of the shift register 18. Also during the second clock pulse, if a nine bit data word is being used, the fifth data line conveys the ninth data bit to the serial-in connection of the shift register 18. On the trailing edge of the second clock pulse, the OCIA interface indicates to the I/O device that data is ready. The I/O device will then begin sending clock pulses which will serially shift the data out to the I/O device. The ninth data bit supplied during the second clock pulse occupies the place of the first data bit shifted out of the shift register. The clock pulses controlling the serial transfer of information from the shift register 18 are supplied by the I/O Device. The programmable bit counter 20, a down counter, counts each time a clock pulse is sent by the I/O Device. When the programmable bit counter 20 reaches zero, it signals the microcontroller 4 that a complete data word has been transferred. When the bit counter 20 counts nine or ten (representing an eight or a nine bit word plus a start bit), depending on word length, it signals the microcontroller that data transfer is complete.

The counter and shift register control circuit 22 of the OCIA interface board controls the transfer of information from the microcontroller 4 to the bit counter 20 and shift register 18.

The OCIA interface's optical interface 26 converts electrical data signals received from the programmable length shift register 18 into signals capable of optical transmission from the OCIA interface board to the attached I/O Device. The optical interface 26 is also capable of receiving optical signals from the I/O Device and converting them to digital electrical signals. These received signals include data clock pulses from the attached I/O Device to control the transfer of data from the scanner to the I/O Device.

Figure 10:
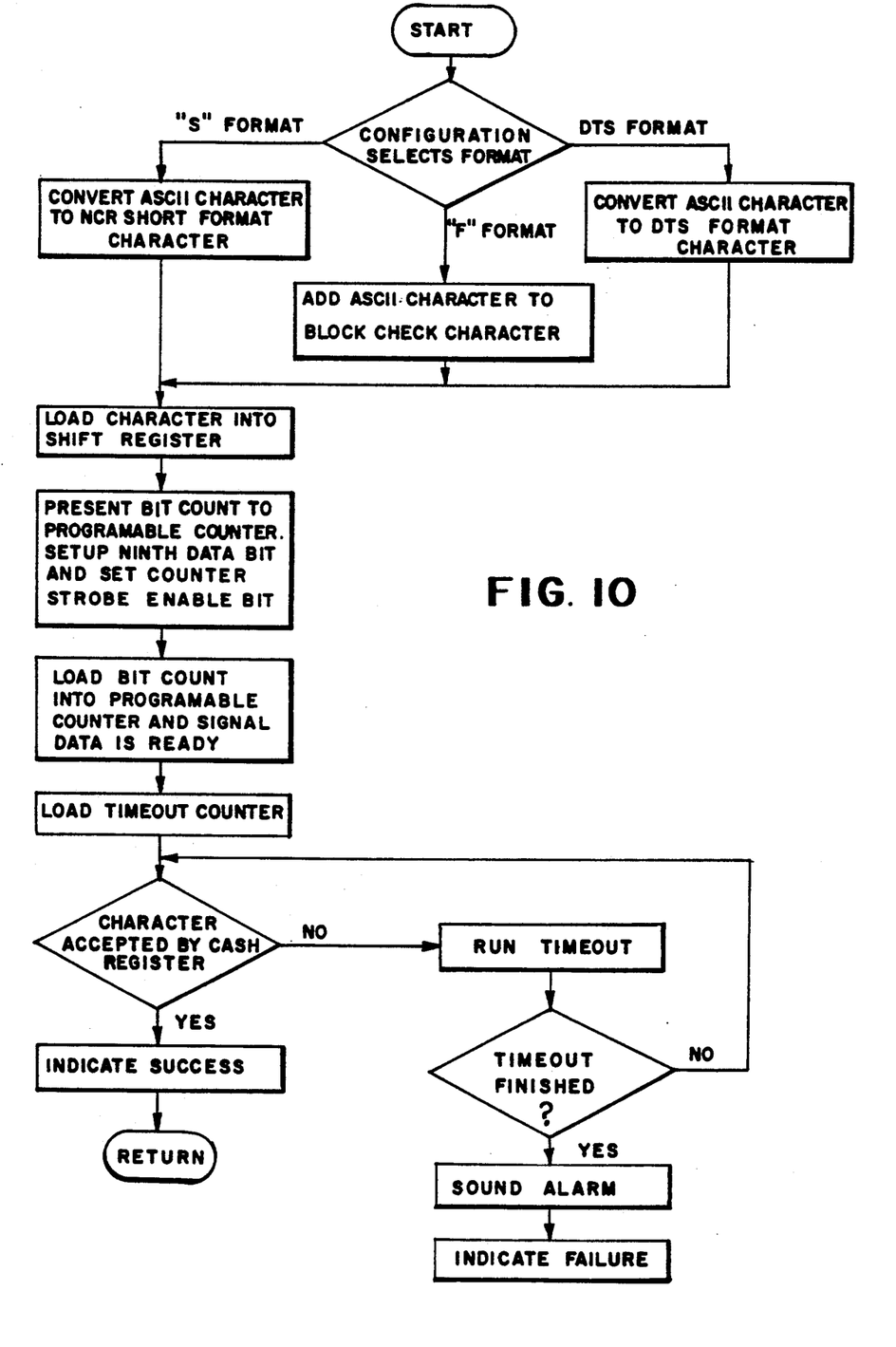
FIG. 10 is a flow chart showing the operational sequence undertaken by the scanner to program the OCIA interface card of FIG. 2 to accept data words having various numbers of data bits.

The program carried out by the identification and control circuit 22 in cooperation with the other circuits of the OCIA is shown in FIG. 10.

The second types of devices compatible with the scanner are devices operable with RS-232 signals. As in the OCIA interface board, the RS-232 interface board, shown in FIG. 3, includes an interface identification circuit 28. The RS-232 interface board also contains line drivers 30, line receivers 32, a magnetic card reader input 34 and a wand emulation output circuit 36

Figure 3:
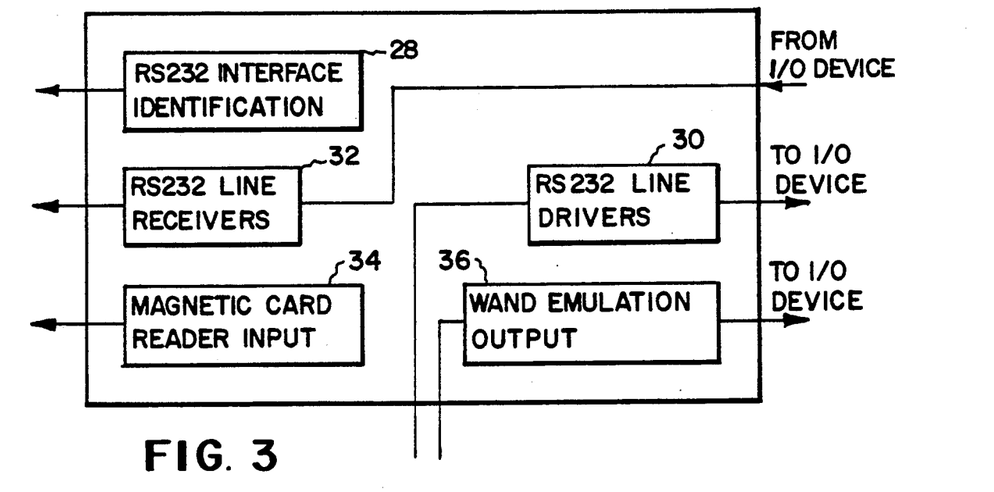
FIG. 3 is a block diagram of interface circuitry on another card which operates in accordance with the RS-232 protocol.

The RS-232 interface board receives by serial transfer decoded signals from the microcontroller 4. The line drivers 30 then serially convey the decoded signal to the I/O Device. The line receivers 32 receive information and control signals serially from the I/O Device and apply them serially to the microcontroller 4.

The magnetic card reader circuit 34 is designed to allow the attached I/O Device to receive information read from magnetic media such as the stripes on the backs of credit cards. The magnetic card reader 34 is situated between the scanner and the I/O Device, and when a magnetic stripe is read, the microcontroller 4 is interrupted to begin processing the magnetically stored information. The magnetic card reader input 34 converts the magnetically stored information into digital electrical signals. These signals are sent to the microcontroller 4, converted to ASCII characters and returned in the proper format to the RS-232 interface board. The decoded signals are then applied to the I/O Device through the line drivers 30.

The wand emulation circuit 36 allows the bar code scanner to be used with I/O Devices designed to accept signals only from hand-held optical wands. Wand emulation is enabled by scanning a programming label prior to initial use. When the scan engine conveys to the decoder an electrical signal representing a bar code, the microcontroller 4 decodes the signal, reencodes it to simulate the output of an optical wand and delivers the signal at a reduced speed to the wand emulation output circuit 36. The wand emulation circuit 36, using an open collector pull-up amplifier circuit, delivers the information to the I/O Device at a speed simulating the rate of information delivery of a hand-held wand. As a result, the signal appears to the I/O Device as though it was processed by an optical wand.

The third types of I/O Devices capable of operating with the scanner are devices employing the IBM 4683 data format, such as the IBM 4683 cash register. As does each of the previously described interface boards, the 4683 interface board, shown in FIG. 4, includes an interface identification circuit 38. The IBM 4683 board also contains a protocol controller 40, a transceiver 42, a program storage device 44, a magnetic card reader 46 and a wand emulation circuit 48.

Figure 4:
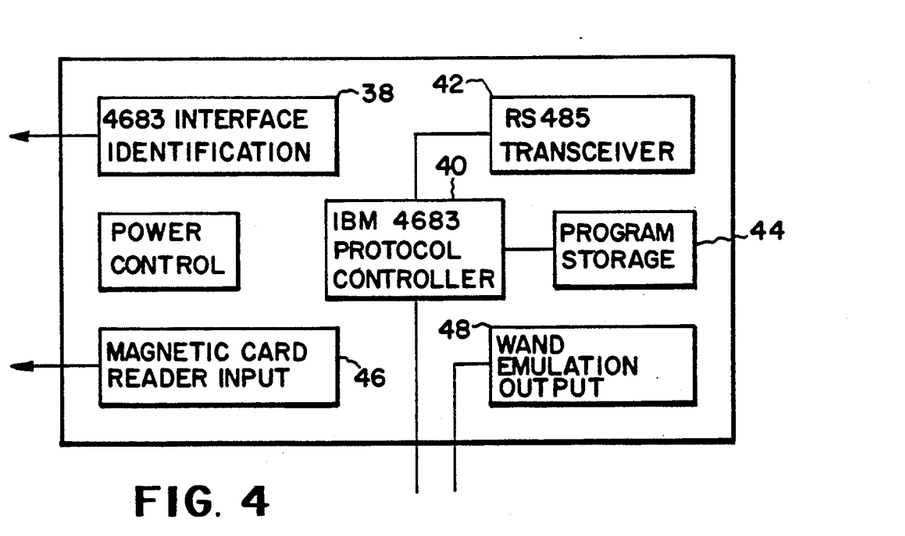
FIG. 4 is a block diagram of the circuitry of another interface card which provides an interface with the IBM 4683 transaction terminal (an RS-485 protocol)

The protocol controller 40 controls the parallel transfer of data between the microcontroller 4 and the 4683 interface and also the serial transfer of data between the 4683 interface and the attached I/O Device.

The transceiver 42 communicates with the attached I/O Device by sending information signals and/or receiving control signals via a serial data path. The magnetic card reader input 46 and wand emulation output 48 circuits function in the same manner as in the RS-232 board.

The fourth types of I/O Devices capable of operating with the scanner are systems employing a keyboard in conjunction either with a cash register, video terminal or an IBM PC I/O Device. The PC's may either be AT, XT or PS/2 models, and the operator sets the proper format by scanning a programming label prior to initial use. In such a system, the bar code scanner acts as a wedge and is inserted between the keyboard and the computer, so that when bar code information is sent from the scanner it appears as if it came from the keyboard. The wedge interface board, shown in FIG. 5, includes interface identification 50, wedge/serial select/control 52, keyboard wedge input/output 54, serial TTL input/output 56, magnetic card reader 58 and wand emulation 60 circuits.

Figure 5:
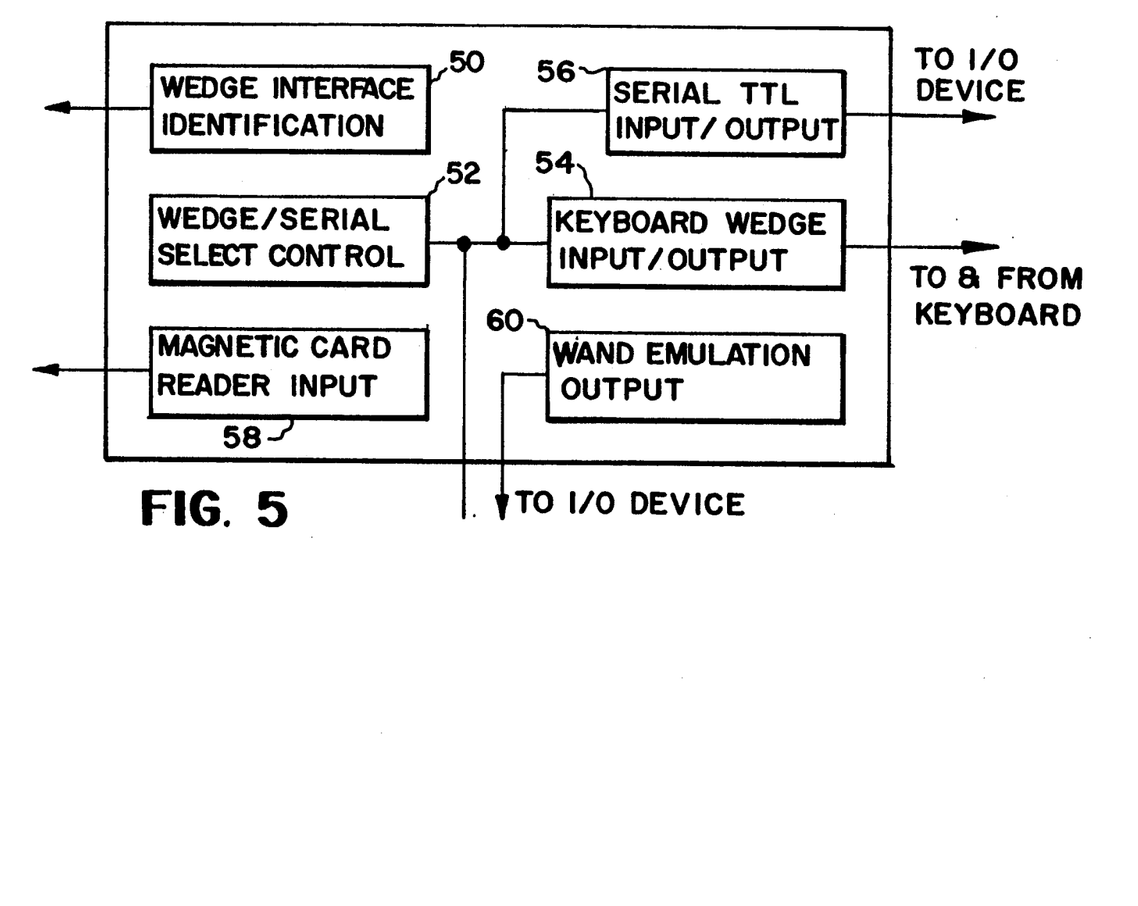
FIG. 5 is a block diagram of the circuitry of another interface card which operates in accordance with the wedge format.

The wedge/serial select/control circuit 52 switches from keyboard operation to scanner operation when a bar code has been scanned and returns the system to keyboard operation when scanning has been completed. That is, during normal operation, the computer looks for input from the keyboard. When the operator scans a bar code, the select/control circuit 52 switches to direct the decoded bar code signal to the computer. The computer processes the code as if it was input from the computer keyboard. The wedge/serial select/control circuit 52 then returns the system to normal, keyboard operation.

The TTL input/output circuit 56 is designed to deliver serial information to the attached computer at TTL logic levels. The interface identification 50, magnetic card reader input 58 and wand emulation output 60 circuits operate in the same manner as described above.

The electrical connector 62 which receives and electrically connects an interface board 64 and the decoder board 66 is shown in FIGS. 6 through 8. The connector 62 is a bridging connector which receives male electrical connectors from each of the two boards. The interface board 62 can therefore be easily replaced by unplugging it from the connector and plugging in a second interface board. As can be seen in FIG. 6, the decoder board 66 in the preferred embodiment of this invention is received in the left side of the connector 62 and the interface board 64 in the right side.

From the foregoing description it will be apparent that there has been provided an improved bar code scanning system. While various embodiments of the invention have been described, variations and embodiments thereof within the scope of the invention will undoubtedly suggest themselves to those skilled in the art. Accordingly, the foregoing description should be taken as illustrative and not in a limiting sense.

We claim:

1. In a bar code scanning system with an optical scanning mechanism and associated circuits for reading bar code signals and digitizing such signals into digital electrical signals, an I/O device selected from a group of such devices which receives input signals corresponding to said bar codes from said system and provides control signals for control of said system, the improvement comprising signal processor and interface apparatus for handling said bar code and control signals, means for decoding said digital electrical signals into decoded signals, said decoded signals having a format, means for selectively varying said format into configurations recognized by different ones of said I/O devices, and interface means for storing and applying an identification code representing the identity of a selected one of said devices to said decoding means for operating said decoding means and for transferring said decoded signals and said command signals between a selected one of said I/O devices and said decoding means.

2. The system according to claim 1 wherein said decoding means comprises a program storage device having storage capability for storing a program of a series of logical operations performed when said system is energized to detect the identity of said I/O device and also being capable of storing a routine used to operate on said bar code signals to decode them so as to be compatible with said I/O device identified by said identification code.

3. The system according to claim 1 wherein said improvement further comprises means for separately receiving a first circuit board providing said decoding means and a second circuit board providing said interface means, said receiving means electrically connecting said first circuit board and said second circuit board, said second circuit being removably attached to said connecting means when said connecting means is in receipt of said second circuit, whereby said interface means can be replaced by a different interface means configured to operate with a different I/O device and said system can be used with different ones of said I/O devices having various operating characteristics.

4. The system according to claim 1 wherein said interface means includes an interface identification circuit, said interface identification circuit storing said identification code, and wherein said decoding means includes interface identification and control means responsive to said identification code for reading said identification code and for applying said identification code to a program storage device, said program storage device being capable of storing a series of logical operations to be performed on said bar code signals so as to make them compatible with said I/O device identified by said identification code.

5. The system according to claim 4 wherein said decoding means further comprises a configuration storage device having storage capability for storing a program of a series of logical operations to configure said decoding means for operation with said I/O device.

6. The system according to claim 1 wherein said interface means can be replaced by a different interface means configured such that said system can operate with a different I/O device.

7. In a portable bar code reading instrument for scanning an optical beam across a symbol for reading data represented by said symbol in response to light returned to said instrument, said instrument having a housing, a handle attached to said housing, a trigger attached to said handle for activating said optical beam, a scan engine which includes a light source for producing the optical beam which scans across the symbol, and means for translating said returned light into electrical signals, the improvement comprising:
- decoding means for translating said electrical signals into a first decoded signal having a first format recognizable by an attached I/O device, and int a second decoded signal having a second format recognized by a different attached I/O device, and
- interface means for directing said decoded signal to said attached I/O device and for receiving information and control signals from said I/O device said interface means identifying the attached I/O device and providing control signals to said decoding means to condition said decoding means to provide said decoded signals in the format recognized by the attached I/O device.

8. The instrument according to claim 7 wherein said decoding means comprises:
- a microcontroller, said microcontroller having means for controlling said scan engine and causing logical operations to be performed on said electrical signals to convert said signals to said first or said second decoded signals; and further comprising
- a scan engine interface circuit, said scan engine interface circuit having means for directing said electrical signals from said scan engine to said microcontroller and applying control signals to said scan engine from said microcontroller,
- switching means for delivering electrical power to said unit from either a battery internal of said unit or from a power supply external of said unit, said switching means automatically providing power from said battery when said external power is interrupted,
- interface identification and control means for receiving an I/O device identification code from said interface means, converting said identification code to an identification token and applying said token to said microcontroller,
- configuration storage means for storing a routine used by said microcontroller to configure said instrument for operation with said I/O device
- data storage means for storing supplementary digital information signals required to be conveyed with said decoded signals, said data storage means being capable of being powered by a battery, and
- program storage means for storing a first routine performed when said instrument is energized to detect the identity of said attached I/O device and for storing a second routine used to convert said electrical signals to signals compatible with said I/O device.

9. The instrument according to claim 8 wherein said interface means comprises:
- interface identification means for storing and delivering to said decoder means a code identifying said I/O device,
- a programmable length shift register, said shift register being capable of receiving and transferring data words having different numbers of bits per data word,
- a programmable bit counter, said counter receiving word length signals from said microcontroller, said counter counting said bits of information transferred from said shift register and informing said microcontroller when a complete data word has been transferred from said shift register to said I/O device, and being capable of adjustment to allow data words of varying length to be transferred to and from said shift register,
- a counter and shift register control circuit for directing said data words to said programmable length shift register and said word length signals to said bit counter;
- an optical interface circuit for converting said data word to a first optical signal and applying said first optical signal to said I/O device and for receiving a second optical signal representing clock pulses from said I/O device and applying said second optical signal to said shift register.

10. The instrument according to claim 8 wherein said I/O device is a device capable of responding to optically coupled interface adapter signals.

11. The instrument according to claim 8 wherein said interface means comprises:
- interface identification means for storing and delivering to said decoder means a code identifying said I/O device,
- line driving means for serially applying said decoded signals to said I/O device,
- line receiving means for receiving serially transmitted signals from said I/O device,
- magnetic card reader input means for reading data from magnetic media, converting said data to a converted electrical signal and applying said converted electrical signal to said decoding means for decoding to a form recognized by said I/O device, and
- wand emulation output means for conveying bar code signals to said I/O device in a format resembling an output signal of an optical wand, whereby said system can cooperate with an I/O device designed to operate with said wand.

12. The instrument according to claim 11 wherein said I/O device is capable of responding to RS-232 signals.

13. The instrument according to claim 8 wherein said interface means comprises:
- interface identification means for storing and delivering to said decoder means a code identifying said I/O device,
- serial TTL I/O means for serially applying said decoded signals at TTL signal levels to said I/O device and serially receiving electrical information signals at TTL signal levels from said I/O device, wedge/serial select/control means for selecting between a first source of decoded information signals and a second source of decoded information signals, said first source being a keyboard and said second source being said decoder, keyboard wedge I/O means for directing signals between a keyboard and said I/O device, magnetic card reader input means for reading data from magnetic media, converting said data to a converted electrical signal and applying said converted electrical signal to said decoding means, and wand emulation output means for conveying bar code signals to said I/O device in a format resembling an output signal of an optical wand, whereby said system can cooperate with an I/O device designed to operate with said wand.

14. The instrument according to claim 13 wherein said I/O device is an IBM PC or compatible device.

15. The instrument according to claim 8 wherein said interface means comprises:

interface identification means for storing and delivering to said decoder means a code identifying said I/O device, a transceiver for applying said decoded signals to said I/O device and for receiving electrical information signals from said I/O device, protocol controller means for coordinating communication between said decoder means and said I/O device, formatting said code for receipt by said I/O device, and for transferring status information to said decoder means, magnetic card reader input means for reading data from magnetic media, converting said data to a converted electrical signal and applying said converted electrical signal to said decoding means, and wand emulation output means for conveying bar code signals to said I/O device in a format resembling an output signal of an optical wand, whereby said system can cooperate with an I/O device designed to operate with said wand.

16. The instrument according to claim 14 wherein said I/O device is an IBM 4683 computer or cash register or compatible device.

17. The instrument according to claim 8 wherein the instrument further comprises a connector which electrically connects said decoding means and said interface means, said connector allowing easy removal of said interface means for replacement by a second interface means operable with a different I/O device.

* * * * *